United States Patent [19]

Shaw et al.

[11] Patent Number: 5,048,026
[45] Date of Patent: Sep. 10, 1991

[54] FIBER OPTIC AMPLIFIER

[75] Inventors: Herbert J. Shaw, Stanford; Michel J. F. Digonnet, Palo Alto, both of Calif.

[73] Assignee: The Board of Trustees of the Leland Stanford Junior University, Stanford, Calif.

[21] Appl. No.: 191,770

[22] Filed: May 4, 1988

Related U.S. Application Data

[63] Continuation of Ser. No. 537,796, Sep. 30, 1983.

[51] Int. Cl.$^5$ .............................................. H01S 3/30
[52] U.S. Cl. .......................................... 372/6; 372/70; 372/66; 372/75; 359/341; 359/345; 385/15; 385/27
[58] Field of Search .................. 328/20, 66, 78, 6, 25; 350/96.15, 96.18

[56] References Cited

U.S. PATENT DOCUMENTS

| | | | |
|---|---|---|---|
| 3,230,474 | 1/1966 | Keck et al. | 378/70 |
| 3,779,628 | 12/1983 | Kapron et al. | 350/96.15 |
| 3,808,549 | 4/1974 | Mauer | 372/6 |
| 4,281,891 | 8/1981 | Shinohara et al. | 350/96.18 |
| 4,410,235 | 10/1983 | Klement et al. | 350/96.18 |
| 4,553,238 | 11/1985 | Shaw et al. | 372/6 |

FOREIGN PATENT DOCUMENTS 2844129  4/1980  Fed. Rep. of Germany .......... 372/6

Primary Examiner—Leon Scott, Jr.
Attorney, Agent, or Firm—Knobbe, Martens, Olson & Bear

[57] ABSTRACT

A side pumped, fiber optic amplifier comprises an optical fiber, having a first refractive index, formed of a laser material, such as Nd:YAG. A jacket, which surrounds the optical fiber, has a second refractive index, lower than the first refractive index. This jacket is cone shaped and tapers from a large end to a small end. High power laser diodes are mounted on the large end to introduce pump light to pump the optical fiber material. The cone-shaped jacket focuses this pump light to an interaction region at the small end, where the jacket material is quite thin, e.g. on the same order of magnitude as the diameter of the optical fiber. The focused light is absorbed by the optical fiber in this interaction region, and causes an electronic population inversion in the laser fiber material. A signal propagating through the optical fiber stimulates spontaneous emission from the optically excited laser material, thereby resulting in amplification of the signal.

26 Claims, 3 Drawing Sheets $p'$ = PATH LENGTH IN FIBER AMPLIFIER
$2p$ = PATH LENGTH IN PUMP FIBER

FIBER OPTIC AMPLIFIER

This application is a continuation of application Ser. No. 557,796, filed Sept. 30, 1983.

BACKGROUND OF THE INVENTION

The present invention relates to fiber optic amplifiers. The Government has rights in this invention pursuant to Contract Number F33615-79-C-1789 awarded by the Department of the Air Force, Air Force Office of Scientific Research.

The concept of optical amplifiers, based upon the lasing capability of certain materials, particularly on a macroscopic level, is well known. Thus, for example, it is known to place a pumping light source and a single crystal neodymium-yttrium aluminum garnet (Nd:YAG) rod, several millimeters in diameter and several centimeters in length, in a tubular reflective cavity. For example, the light source and Nd:YAG rod may be located, respectively, to extend along the two foci of a cavity having an elliptical cross section. In such an arrangement, light emitted by the light source and reflected from the cavity walls will impinge upon the Nd:YAG rod. The light source is preferably selected to emit wavelengths corresponding to the absorption spectra of the Nd:YAG crystal so that the energy states of the neodymium ions of the crystal are inverted to an energy level above the upper lasing level. After inversion, an initial relaxation of then neodymium ions through phonon radiation yields anion population at the upper laser level. From the upper laser level, the ions will relax, to a lower energy level, emitting light of a wavelength which is characteristic of the Nd:YAG material. Advantageously, this lower energy level is above the ground level for the ions so that a rapid, phonon-assisted relaxation will occur between this lower energy level and the ground level, enabling a high inversion ratio to continue to exist between the upper laser level and this lower energy level, within the pumped ions.

With the population so inverted, as is well known from laster technology, the Nd:YAG will also provide fluorescence, that is, random emission of incoherent light. This spontaneous radiation takes place with a time constant equal to the average lifetime of ions in the inverted state is 230 microseconds for Nd:YAG.

If, after the neodymium ions of the Nd:YAG rod have been inverted, a light signal at the laser transition frequency is transmitted through the rod, the signal photons will trigger the transition of the neodymium ions, to the lower energy level, causing coherent emission of stimulated radiation, which will effectively add to the transmitted signal, thus amplifying this signal.

The absorption length of the Nd:YAG crystal at the pump wavelength (i.e., the length of material through which the illumination must traverse before 60% of the illumination is absorbed) is typically about 2 millimeters or more, and thus the Nd:YAG crystals used in amplifying structures have had diameters at least this large so that the crystal could absorb a substantial portion of the pumping radiation during the initial reflection from the cavity walls and passage through the crystal. If, during this initial traverse through the crystal, the pumping illumination is not absorbed, it is likely to be reflected by the cavity walls back to the light back to the light source, where it will be reabsorbed, it is likely to be reflected by the cavity walls back to the light source, where it will be reabsorbed, generating heat in the light source and reducing the overall efficiency of the amplifier.

When such large diameter Nd:YAG rods are used as amplifiers in fiber optic systems, it has been thought necessary to use optical components, such as lenses, to focus the light signal from the optical fiber into the Nd:YAG rod, and the amplified light signal from the Nd:YAG rod back into another fiber. Such optical systems require careful alignment and are susceptible to environmental changes, such as vibration, and thermal effects. Additionally, the optical components and the size of the Nd:YAG rod make the amplifying system relatively large, and thus impractical for certain applications. Furthermore, the large size of the Nd:YAG rod requires a large mount of input pump energy in order to maintain a high energy density within the rod and allow for a significant optical gain. Such large pump power requires high output pump light sources, generating substantial heat which must be dissipated, typically by liquid cooling of the cavity.

While amplifiers of this type are useful in many applications, such as some communication applications, use in a recirculating fiber optic gyroscope puts severe restrictions upon the amplification system. With such gyroscopes, optical fiber, typically a kilometer or more in length, is wound into a loop, and a light signal is recirculated within the loop, typically in both directions. Motion of the loop causes a phase difference between the counter-propagating light signals which may be used to measure gyroscope rotation. In such gyroscopes, the phase difference induced in one signal pass around the fiber is relatively small, and it is advantageous to recirculate the light signal within the loop as many times as possible to increase this phase difference.

In traversing a kilometer of optical fiber, an optical signal will typically lose 30 to 50 percent of its intensity. If an amplifier were placed in series with the loop, and were capable of amplifying the bidirectional counter-propagating light signals by 2 to 3 dB, it would permit a light signal to propagate many times within the loop.

Unfortunately, the relatively large size, high power and cooling requirements of prior art Nd:YAG rod amplifiers, as described above, make such amplifiers relatively impractical for high accuracy gyroscopes. These factors, of course, also limit the utility of such amplifiers in other applications, such as communication networks.

SUMMARY OF THE INVENTION

The present invention is a fiber optic device for producing coherent light, which in the preferred embodiment, functions as an optical amplifier. This amplifier comprises an optical fiber, which provides a waveguide for the signal to be amplified. The optical fiber is formed of a laser material, such as Nd:YAG. A jacket surrounds at least a portion of this optical fiber along its length. The jacket includes a first end for receiving pump light, and a second end which has a diameter smaller than the first end. A transition portion between these ends focuses the pump light from the first end to the second end. The index of refraction of the jacket is lower than the index of refraction of the optical fiber to cause the focused pump light to refract from the jacket into the fiber, and thus, cause inversion of the electronic population of the fiber material to permit the optical signal to stimulate the emission of photons from the laser material. Preferably, the thickness of the jacket at the second or smaller end is no more than about one-half the radius of the optical fiber. The jacket is surrounded by a material, such as air, which has a refractive index lower than that of the jacket to cause the pump light to be guided within the jacket, while the jacket provides a cladding for guiding the signal to be amplified within the optical fiber. In the preferred embodiment, the jacket is symmetrical about its central longitudinal axis, and the optical fiber lies along such axis.

In the preferred embodiment, the pump light is produced by a light source, such as a laser diode, and is preferably collimated, for example, by a collimating lens. The light sources may be mounted on the first end of the jacket at a location which is radially offset from the optical fiber. If a high power laser diode is utilized as the light source, it is advantageous to orient the lengthwise direction of the emitting area of the diode so that it is normal to a radial line passing through the central longitudinal axis of the jacket.

In a method of side pumping an optical fiber formed from laser material, the fiber is surrounded with a jacket having an index of refraction lower than that of the optical fiber. The jacket has a cross section at one end which is large compared to the cross section at the other end. Pump light is introduced into the end of the jacket having the large cross sectional area, and such pump light is focused to the other end, so that the focused pump light is refracted into the amplifier fiber along the periphery thereof to cause an electronic population inversion. Preferably, the thickness of the jacket at the end having the small cross sectional area is less than one-half the radius of the optical fiber.

BRIEF DESCRIPTION OF THE DRAWINGS

These and other features of the present invention are best understood to reference to the drawings, in which.

DETAILED DESCRIPTION OF THE PREFERRED EMBODIMENT

Figure 1:
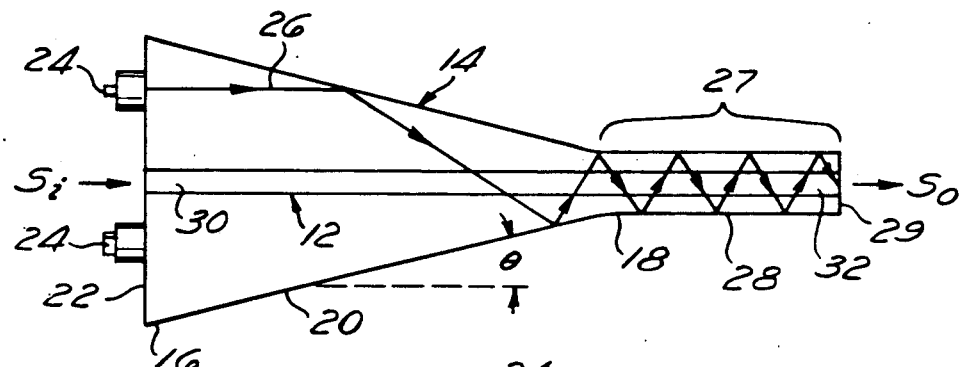
FIG. 1 is a diagram showing the physical arrangement of the preferred embodiment of the amplifier of the present invention showing a Nd:YAG optical fiber buried in a cone shaped jacket.
Figure 2:
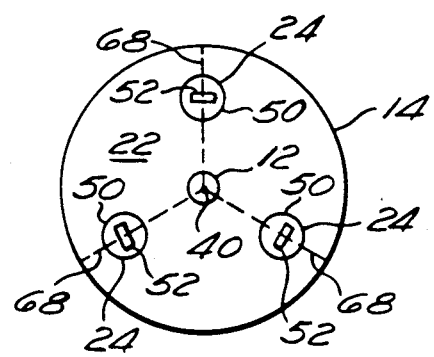
FIG. 2 is an elevation view of one end of the arrangement of FIG. 1 showing laser diodes and collimating lenses mounted on the large end face of the cone shaped jacket, and illustrating a preferred orientation for the laser diodes in which the dimension parallel to the laser diode junction (i.e. lengthwise dimension of the junction) is disposed normal to a radial line passing through the longitudinal axis of the cone shaped jacket.
Figure 3:
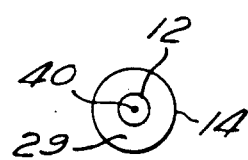
FIG. 3 is an elevation view of the other end of the arrangement of FIG. 1 illustrating the reduced thickness of the jacket in the interaction region.

Referring initially to FIGS. 1 to 3, the preferred embodiment of this invention includes a signal or amplifier fiber 12, which is surrounded by a jacket 14.

The signal fiber 12 comprises a laser material, which may be formed as a single crystal of ion doped material, such as Nd:YAG, which has a laser transition at the frequency to be amplified, i.e., the signal frequency. In an exemplary configuration, the signal fiber 12 may have a diameter of approximately 100 microns, which is uniform along its length.

The surrounding jacket 14 may be formed from a variety of materials such as glass, crystal materials, expoxies, low loss plastics, or liquids (if contained in a suitable preform or mold). In the preferred embodiment, the jacket 14 is quartz. This jacket 14 is cone shaped and has a large end 16 which tapers to a small end 18 with a transition portion 20 therebetween. By way of specific example, the large end 16 may have a diameter of about 3 millimeters; the small end 14 may have a diameter of about 200 microns; the length of the transition portion 20 between the end portions 16, 18 may be about 1 centimeter; and the taper angle $\theta$ may be about 8°. It will be recognized that the drawings are not to scale, but only illustrative. The jacket 14, in the preferred embodiment is symmetrical about its central longitudinal axis 40 (FIG. 2) and the fiber 12 is disposed along the longitudinal axis 40 of the jacket 14. Advantageously, since the jacket 14 surrounds the fiber 12, the ends 30, 32 of the fiber 12 are readily accessible for e.g. butt coupling to e.g. transmission or carrier fibers (not shown).

As best seen in FIG. 2, the large end 16 of the jacket 14 has a planar face 22 which has a diameter which is large compared to the diameter of the fiber 12 to permit the mounting of plural pump light sources 24 thereon. The plural pump light sources 24 are mounted on the face 22 to input pump light into the large end 16 of the cone shaped jacket 14. Preferably, the light input by the sources 24 is collimated, so that its direction of propagation is initially parallel to the central axis of the cone shaped jacket 14 and parallel to the signal fiber 12.

For the description which follows, it will be assumed that an input light signal $S_i$, which is to be amplified, is input to one end 30 of the signal fiber 12 and is output, after amplification, from the other end 32 of the fiber 12 as an output light signal $S_o$. It should be recognized, however, that in many applications, such as communication and rotation sensing applications, signals will be input at both ends 30, 32 of the fiber 14 and should be uniformly amplified regardless of the direction of propagation through the fiber 12.

The jacket 14 is transparent to the wavelength of light from the pumping sources 24. It is preferable that the jacket 14 have as low a loss characteristic at this frequency as possible, whereas it is advantageous to have the absorption length of the Nd:YAG fiber 12 at this frequency as short as possible. As may be seen from FIGS. 1 to 3, the jacket 14 advantageously provides a 360° interface with the fiber 12, and thus, provides a large fiber to jacket contact area for transferring pump light from the jacket 14 to the fiber 12.

The indices of refraction of the fiber 12 and the jacket 14 are selected to permit the signal fiber 12 to guide the signal $S_i$ input at its end 30. Thus, the jacket 14 provides a cladding for the fiber 12, which is advantageous for reducing propagation losses in the fiber 12, particularly if the refractive index of the jacket 14 is close to, but slightly lower than, the refractive index of the fiber 12. For example, the use of a high index glass for the jacket 14 in combination with the Nd:YAG fiber would yield relatively low propagation losses in the fiber 12.

The indices of the jacket 14 and fiber 12 are also selected to allow light from the pumping sources 24 to enter the fiber 12 from the jacket 14 and to be at least partially absorbed by the fiber 12. Thus, in the preferred embodiment, the Nd:YAG fiber 12 has a refractive index $n_1$ equal to about 1.82. The quartz jacket 14, on the other hand, has an index of refraction $n_2$ of about 1.45. Finally, the refractive index $n_3$ of the material surrounding the jacket 14, is less than the refractive index $n_2$ of the jacket 14. Thus the refractive indices are selected such that $n_1 > n_2 > n_3$. In the example shown in FIG. 1, the refractive index $n_3$ is formed by air, although it should be understood that a secondary cladding may surround the jacket 14 to reduce losses which may otherwise occur at the interface between the jacket 14 and the surrounding air, due to surface irregularities, and resultant scattering, in the jacket 14.

As the light pump enters the cone shaped jacket 14, it undergoes multiple total internal reflections so as to focus and compress the light as it propagates towards the small end 18. For clarity of illustration, only a single ray 26 is shown as entering the cone shaped jacket in FIG. 1. It will be seen that due to the taper geometry of the cone shaped jacket 14, the ray 26 makes multiple total internal reflections at successively greater angles of incidence with respect to the wall of the cone shaped jacket 14. As is well known in the art, the term "angle of incidence" defines the angle between a ray (e.g. the ray 26) and a line drawn normal to the reflecting surface (e.g. wall of the jacket 14) at the point of incidence of the ray with that surface. The ray will be totally reflected at the wall of the jacket 14, so long as the angle of incidence is greater than an angle, commonly referred to as the "critical" angle, which depends upon the difference in the indices of refraction between the jacket 14 and surrounding medium. In the preferred embodiment, the jacket is formed of amorphous quartz (fused silica), while the surrounding medium is air, yielding a critical angle of about 43.6°. Accordingly, the cone angle $\theta$ and cone length should be selected such that as light passes through the jacket 14, from the end 16, to the end 18, the angle of incidence is less than the critical angle, so that substantially all of the light entering the large end 16 of the jacket 14 will be coupled to the small end 18. In general, the required cone angle depends upon the ratio of the area of the input face 22 relative to the cross sectional area of the end 18, as well as the difference in index of refraction between the jacket 14 and the surrounding medium (e.g., air). Mathematical techniques for calculating the cone angle are well known in the art, and are described e.g. in *Fiber Optics: Principles and Applications*, by N. S. Kapany, Academic Press (1967), pages 18-22. Although the angles of incidence successively increase as light propagates through the jacket 14, the angle of incidence will eventually stabilize when the diameter of the jacket 14 or other guiding structure becomes uniform, e.g. at the end 18, where the thickness of the jacket 14 surrounding the fiber 12 becomes generally uniform through a length 27, which will be referred to as the interaction region 28.

Thus, the cone shaped jacket 14, in effect, focuses the collimated pump light input by the sources 24 into the small end 18 and compresses the pump light so that the optical density (i.e. intensity per unit area) of the pump light is increased at the small end 18. This focused light is absorbed along the length 27 by the Nd:YAG material, which causes an electronic population inversion in the interaction region 28 so as to permit amplification. Those skilled in the art will understand that the ray 26 will be refracted at the jacket 14/fiber 12 interface. For clarity of illustration, such refraction of the ray 26 is not shown in FIG. 1, but will be discussed in detail below, in reference to FIG. 4.

From the above description, it will be understood that, because the refractive index $n_1$ of the fiber 12 is greater than the refractive index $n_2$ of the jacket 14, signals input at the end 30 of the fiber 12, which are to be amplified by the system, are well guided within the fiber 12. Because the refractive index $n_1$ of the fiber 12 is greater than the refractive index $n_2$ of the jacket 14, the pumping light from the sources 24 will be refracted into the fiber 12. However, this pump light, as shown by the exemplary ray 26 of FIG. 1 will be guided by the jacket 14, since the index of refraction $n_2$ of the jacket 14 is greater than the index of refraction $n_3$ of the surrounding material (e.g. air), provided the cone angle $\theta$ is properly chosen. Thus, the pumping illumination will be guided within the confines of the jacket 14 for ultimate absorption by the fiber 12. As shown in FIG. 1, the pumping illumination, exemplified by the ray 26, will be absorbed by the Nd:YAG fiber 12 at a rate which is proportional to the ratio of the path length through the fiber 12 to the total path length through the fiber 12 and jacket 14. For this reason, it is advantageous to make the size of the jacket 14 as small as possible, particularly through the length 27 in the interaction region 28, to increase the absorption per unit length of the Nd:YAG fiber 12. As best seen in FIGS. 1 and 3, the jacket 14 is quite thin in the interaction region 28, being e.g. on the same order of magnitude as the radius of the fiber 12.

Figure 4:
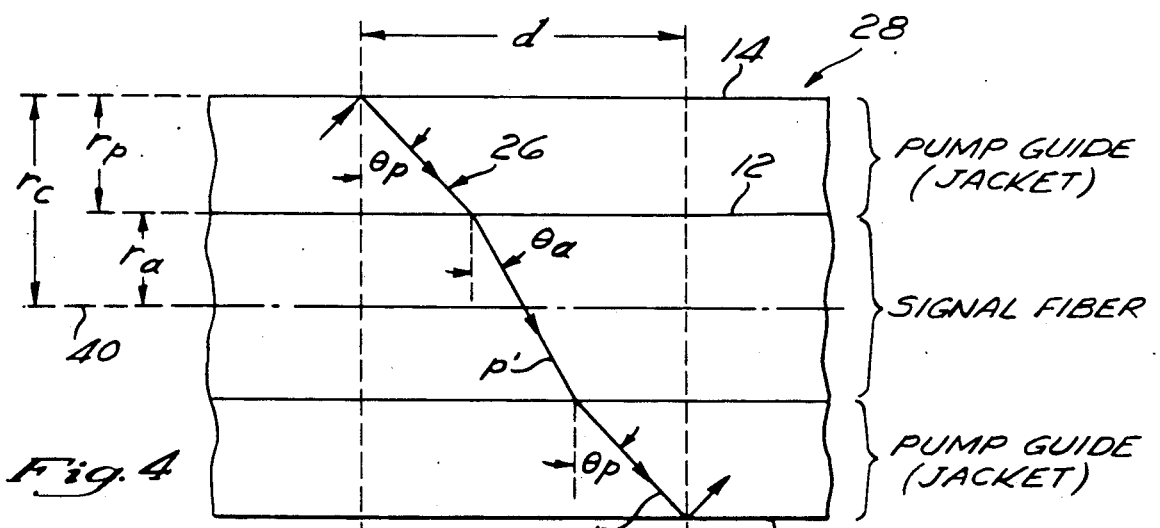
FIG. 4 is a schematic diagram showing the optical path of an exemplary ray as it propagates between the air/jacket boundary on one side of the amplifier structure to the air/jacket boundary on the other side of the amplifier structure over a length d of the interaction region.

FIG. 4 is a schematic diagram showing one pass of the ray 26 through the signal fiber 12 as the ray propagates through a longitudinal distance d in the interaction region 28. For clarity of illustration, the ray 26 is assumed to be an axial ray, i.e. a ray which continuously lies in a plane passing through the longitudinal axis 40 (FIG. 2) of the fiber 12. As shown in FIG. 4, the pump ray 26 undergoes a total internal reflection at an angle $\theta_p$ at the interface between the quartz jacket 14 and surrounding air for propagation towards the signal fiber 12. At the interface between the jacket 14 and signal fiber 12, the ray 26 is refracted such that it enters the signal fiber 12 at an angle $\theta_a$. The ray 26, after propagating transversely through the signal fiber 12, is again refracted such that it again enters the quartz jacket 14 at an angle of $\theta_p$. Upon reaching the interface between the quartz jacket 14 and surrounding air, the ray 26 is again totally internally reflected at an angle $\theta_p$. This sequence repeats itself multiple times along the interaction region 28.

During the above-described propagation of the ray 26 through the distance d in the interaction region 28, the ray 26 first traverses an optical path p through the upper portion of the pump guide or jacket 14, then traverses an optical pathlength p′ through the signal fiber 12, and finally traverses the optical pathlength p through the lower portion of the pump guide or jacket 14. Thus, the total pathlength of the ray 26 in the amplifier fiber 12 is p′ while the total pathlength in the pump guide 14 is 2p. Since passage of the pump ray 26 through the pump guide 14 does not contribute to pumping the fiber amplifier, the amount of pump power absorbed along a length L of the interaction region 28 of the amplifier is dependent upon the ratio of the pump ray path in the signal fiber 12 to the total ray path over the distance L. Such absorbed pump power per length L may be defined as follows:

$$P_{abs} \approx \exp(-\alpha_a \eta L) \tag{1}$$

where $\alpha_a$ is the absorption coefficient of the amplifier medium at the pump frequency and $\eta$ is the efficiency factor of the pump structure. The efficiency factor is defined as the ratio of the ray path in the amplifier to the total ray path over the distance L, where L is large in comparison to d (FIG. 4). Thus, if the efficiency factor $\eta$ is 1.0, the pump light spends all of its time in the signal fiber 12, while if the efficiency factor is zero, the pump light spends no time in the signal fiber 12.

In the schematic diagram of FIG. 4, $\eta$ is simply equal to:

$$\eta = \frac{p'}{p' + 2p} \tag{2}$$

From simple trigonometry, it can be shown that:

$$\eta(\theta) = \frac{\epsilon \cos\theta_p}{\epsilon \cos\theta_p + [1 - (n_2/n_1 \sin\theta_p)^2]^{\frac{1}{2}}} \tag{3}$$

where $\epsilon$ is the ratio of the radius $r_a$ of the signal fiber 12 to the difference between the radius $r_c$ of the entire structure and the radius $r_a$ of the signal fiber. Stated another way, $\epsilon$ is equal to the ratio of the signal fiber radius $r_a$ to the jacket thickness $r_p$; and $n_2$ and $n_1$ are the refractive indices of the jacket 14 and fiber 12, respectively. Thus:

$$\epsilon = \frac{r_a}{r_c - r_a} \tag{4}$$

If the refractive index $n_1$ of the amplifier fiber 12 is only slightly higher than the refractive index $n_2$ of the jacket 14, equation (2) reduces to:

$$\eta(\theta) \approx \frac{r_a}{r_c} \tag{5}$$

Thus, the efficiency of the amplifier, in terms of power absorption, is highly dependent upon the radius of the fiber 12 compared to the radius of the overall structure in the interaction region 28. Accordingly, it is preferable to make the jacket 14 as thin as possible through the interaction region 28, and even more preferable, to taper the jacket 14 such that the fiber 12 is unclad through the interaction region 28. Those skilled in the art, however, will recognize that, depending on the size of the fiber 12, it may be difficult to focus the pump light tightly enough such that most of its energy will remain in the unclad fiber 12. Typically, the tighter the focus, the higher the losses as light is focused through the cone shaped jacket 14.

Figure 5:
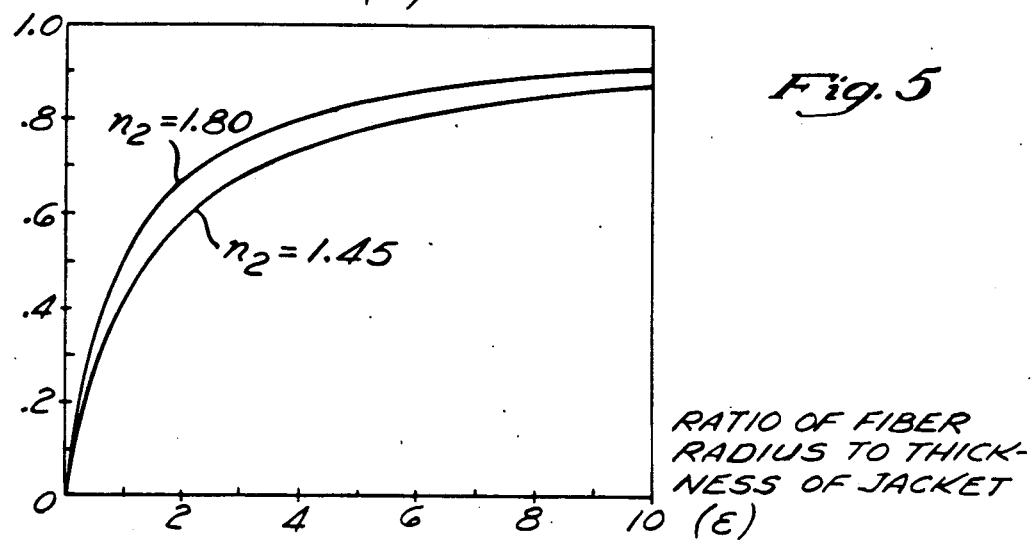
FIG. 5 is a graph of pumping efficiency as a function of the ratio of fiber radius to thickness of the jacket for two exemplary limit values of the jacket refractive index, namely, 1.45 and 1.80.
Figure 6:
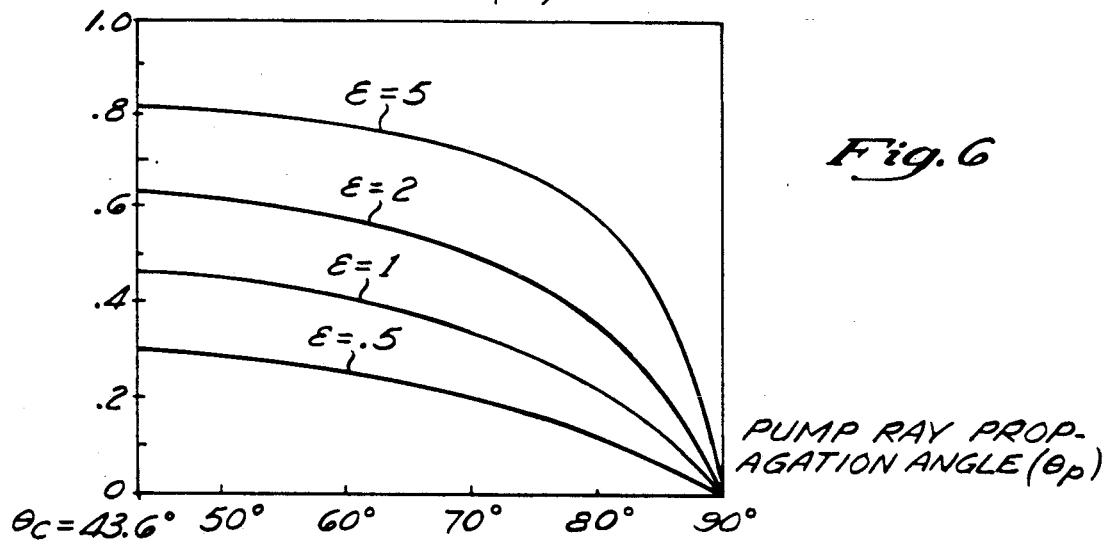
FIG. 6 is a graph of pumping efficiency as a function of the pump ray propagation angle for various values of the ratio of fiber radius to the thickness of the jacket for exemplary values of refractive index of the amplifier fiber and the jacket, namely 1.82 and 1.45, respectively.

As may be seen from FIG. 5, which assumes that $\theta_p$ equals $\theta_c$ (i.e. pump ray angle of incidence equals the critical angle), the efficiency factor approximately doubles by increasing $\epsilon$ from 0.5 to 2, but further increases in $\epsilon$ provide relatively smaller increases in the efficiency factor. Further, FIG. 5 shows that, by increasing the refractive index of the jacket 14 from 1.45 to 1.80 (which is closer to the 1.82 refractive index of the Nd:YAG fiber 12), there is only a small increase in the efficiency factor. Moreover, as shown in FIG. 6, the efficiency factor $\eta$ is fairly constant over a broad range of angles near the critical angle $\theta_c$ for all values of $\epsilon$, and the efficiency factor is at a maximum when $\theta_p$ equals $\theta_c$. From FIGS. 5 and 6, it will therefore be recognized that, the value of $\epsilon$ should preferably be greater than 2, and thus, the radius $r_a$ of the amplifier fiber 12 should preferably be at least twice the thickness $r_p$ of the jacket in the interaction region 28. Stated another way, the overall radius $r_c$ should be less than $1\frac{1}{2}$ times the radius $r_a$ of the amplifier fiber 12. The values shown in FIGS. 5 and 6 were calculated utilizing equation (2), for a Nd:YAG amplifier fiber having an index of refraction of 1.82. The values shown for FIG. 6 assume a quartz pump guide or jacket having an index of refraction of 1.45, while FIG. 5 is plotted for a jacket refractive index of 1.80, as well as 1.45.

In order to excite higher order modes, the light sources 24 may be mounted at locations on the face 22 which are offset from the center of the face, towards the periphery, as shown in FIG. 2. It will be understood from the ray diagram of FIG. 1 that rays entering the face 22 near the periphery of the large end 16 (e.g. the ray 26) will have higher angles of incidence by the time they reach the end 18 than corresponding rays (not shown) which are input closer to the center of the face 22. According to ray theory, such increased angles of incidence are indicative of higher order modes.

Such higher order modes may be advantageous for excitation of the fiber laser material, since the rays (e.g. the ray 26) will make an increased number of reflections, and thus, an increased number of passes through the signal fiber 12 as they propagate along the length 27 of the signal fiber 12, thereby minimizing the length required for substantial absorption of the pump light by the fiber 12 in the interaction region 28. In other words, even though the path of a single ray laterally through the Nd:YAG fiber 12 may be substantially shorter than an absorption length in that material, the plural passes permit the absorption of a substantial percentage of the pump source illumination within the Nd:YAG fiber 12. Additionally, the end faces 22 and 29 of the amplifier structure may be coated with a highly reflective coating which is transparent to light at the signal frequency, but which reflects the pump light, so that any pump light which is not absorbed by the Nd:YAG during the first traverse through the amplifier structure is reflected for additional passes therethrough.

Figure 7:
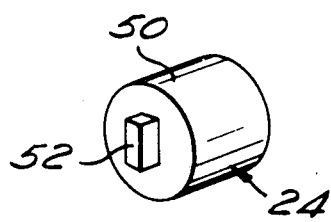
FIG. 7 is a perspective enlarged view of one of the light sources of FIGS. 1 and 2.
Figure 8:
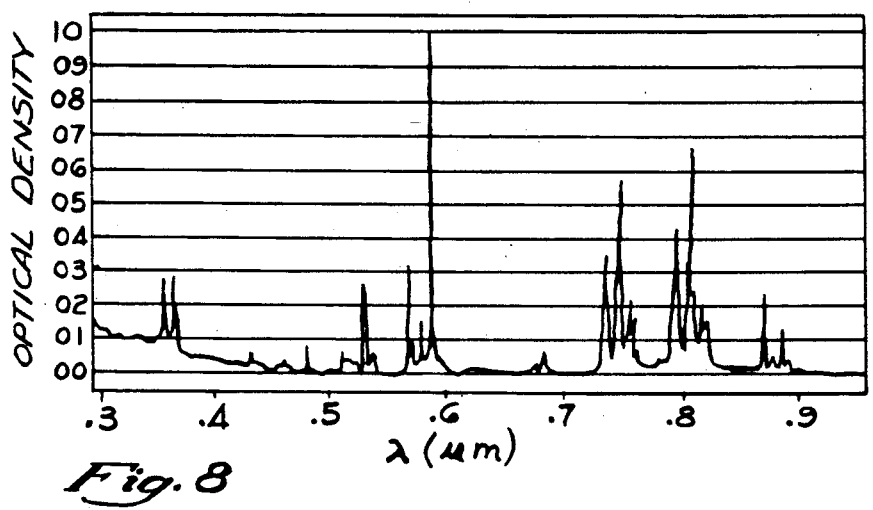
FIG. 8 is a diagram showing the absorption spectrum of Nd:YAG at 300° K.

As shown in FIG. 7, each of the light sources 24 preferably comprises a microlens 50 and a miniaturized light emitting device 52, preferably a high power laser diode, which produces light in one of the high absorption regions, such as the 800 nm region for Nd:YAG as shown in FIG. 8. As is well known in the art, microlenses are extremely small optical glass rods having focusing properties due to gradients of refractive index from center to periphery. They are available in various lengths, diameters, focal lengths, and acceptance angles under the brand name Selfoc Microlenses from Nippon Sheet Glass Company, Ltd., New Jersey office, 136 Central Avenue, Clark, N.J. In the preferred embodiment, the microlens 50 has a focal length of about 1 mm. The laser diode 52 is mounted on the microlens 50 with the laser diode junction close to the input face of the lens 50, and the lens properties are selected to collimate the light produced by the laser diode. Mounting of the laser diode 52 on the lens 50 may be accomplished by any suitable means, such as an adhesive or a mechanical mount. The lens, in turn, may be mounted on the face 22 of the cone shaped jacket 14, for example, by means of optical cement. If desired, several laser diodes 52 may be "stacked" on a single lens 50 to further increase the power. In such case, the diodes may be placed one on top of another, with the lengthwise sides of the diodes touching each other. Further, while the drawings show three such light sources 24 mounted on the face 22, it will be understood that more or less sources 24 may be utilized.

Those skilled in the art will recognize that, if the particular diodes used as the laser diodes 52 have a poor degree of spacial coherence or are multimode, it will generally be impractical to make the length of the emitting area (i.e., the dimension parallel to the laser diode junction) much larger than the overall radius $r_c$ (FIG. 4) of the amplifier in the interaction region 28; otherwise radiation losses may occur due to diffraction caused by the spacial incoherence or due to higher order modes becoming unguided. Unfortunately, present, commercially available, high power laser diodes are typically either multimode, or have a relatively poor spacial coherence, or both. It is expected that this situation will be alleviated as advances are made in laser technology.

Referring to FIGS. 1, 2 and 7, it will be understood that the laser diodes 52 may be utilized without collimating lenses 50, so that light is input to the face 22 directly from the diodes 52. In such case, however, the transmission losses will typically be greater than with a collimating lens, since laser diodes generally emit light in a diverging pattern, and some of the diverging rays may exceed the critical angle with respect to the walls of the cone shaped transition portion 20, thereby causing radiation losses. Tests indicate that with uncollimated input beams (no microlens), transmission through the cone (i.e. the fraction of input light coupled to the interaction region 28) will be no more than about 10 percent, while for collimated light (with microlenses) the transmission will be increased to about 70 percent, or better. Thus, use of the collimating microlenses 50 in combination with the laser diodes 52 is highly advantageous.

For uncollimated light (no microlens), transmission through the cone shaped portion 20 appears to be substantially independent of the location of the laser diode on the face 22. However, in one experiment, it was found that for collimated light (with the microlens 50), transmission through the cone shaped portion 20 increased to a maximum as the light source 24 was moved away from the axis 40 (FIGS. 2 and 3) towards the periphery of the face 22. The optimum transmission position may be found by sliding one of the light sources 24 radially outward from the cone axis 40 on the face 22 until the power transmission, as measured at the end face 29, is at a maximum. This source 24 may then be permanently mounted in this position. The same process may be utilized to locate the other sources 24. In addition, for optimum transmission when the diodes 52 are offset from the axis 40 (FIGS. 2 and 3), it is preferable to orient each diode 52 so that the maximum dimension (i.e. length) of its emitting area is normal to an imaginary radial line 68 on the planar face 22, which passes through the axis 40, as shown in FIG. 2.

Thus, the cone shaped jacket 14 permits a high amount of optical power to be coupled to the interaction region 28, and thus, to the fiber 12, particularly when used in combination with high power laser diodes and collimating microlenses. Such high optical pump power increases excitation of the Nd:YAG fiber 12 and thereby enhances amplification.

Referring now to FIG. 8, which is a diagram of the absorption spectrum of Nd:YAG crystal at 300° K., it can be seen that the Nd:YAG material has a relatively high optical density, and thus a short absorption length, at selected wavelengths. For this reason, it is advisable to select the pumping illumination sources 24 (FIG. 1) to emit radiation at one of these frequencies in order to maximize the absorption of the pumping illumination in the Nd:YAG fiber 12, and thus, to allow the length 27 of the fiber 12 to be as short as possible while still permitting substantially complete absorption of the pumping illumination within the amplifier structure. Those skilled in the art will understand that it is advantageous to make the fiber 12 as short as possible to reduce propagation losses of the signal $S_i$ through the fiber 12. As can be seen from FIG. 8, the wavelength 0.58 microns is well suited for the illumination sources 24, although the wavelengths 0.75 and 0.81 microns are also relatively well suited.

Figure 9A:
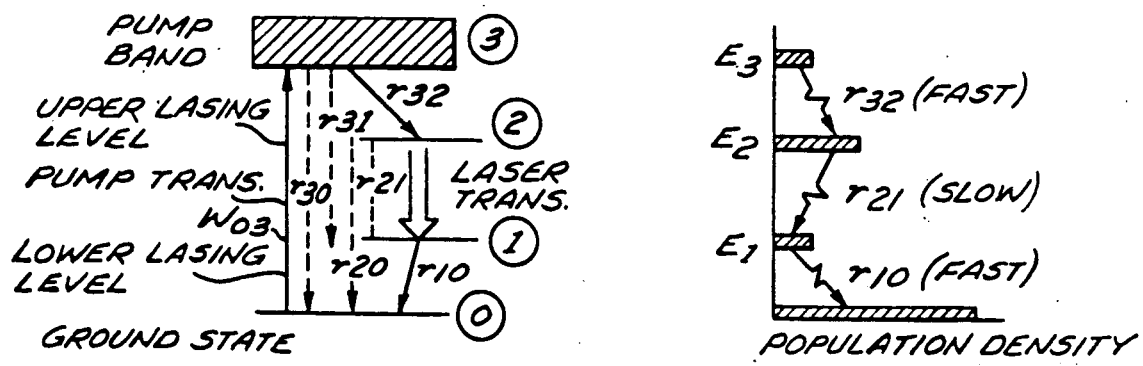
FIGS. 9a and 9b are a simplified energy level diagrams of a four level laser material, such as Nd:YAG.
Figure 9B:
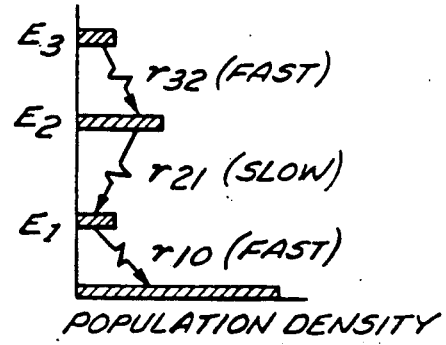

Referring now to FIG. 9A, which is an energy level diagram for the Nd:YAG crystal, it will be understood that, when pump light at the absorption wavelength, described above, is absorbed by the Nd:YAG crystal, the neodymium ions are excited from the ground state to the pump band. From the pump band, the ions quickly relax, through phonon interactions, to the upper laser level. From this upper laser level, the neodymium ions will fluoresce to the lower laser level. From this latter level, a final, rapid phonon relaxation occurs to the ground state. This latter rapid relaxation in a four-level laser system of the type shown in FIG. 9A is advantageous, as it provides a practically empty lower energy level. This feature is shown in FIG. 9B, in which the population densities at the pump band, upper laser level, lower laser level, and ground state are shown for an Nd:YAG fiber during continuous pumping. Because the rate of fluorescence between the upper and lower laser levels is relatively slow in comparison with the phonon relaxation between the pump band and the upper laser level, as well as between the lower laser level and the ground state, the population density at the upper laser level is substantially higher than that at the lower laser level, yielding a high inversion ratio. The average lifetime of the upper laser level, prior to stimulated emission, is 230 microseconds.

Figure 10:
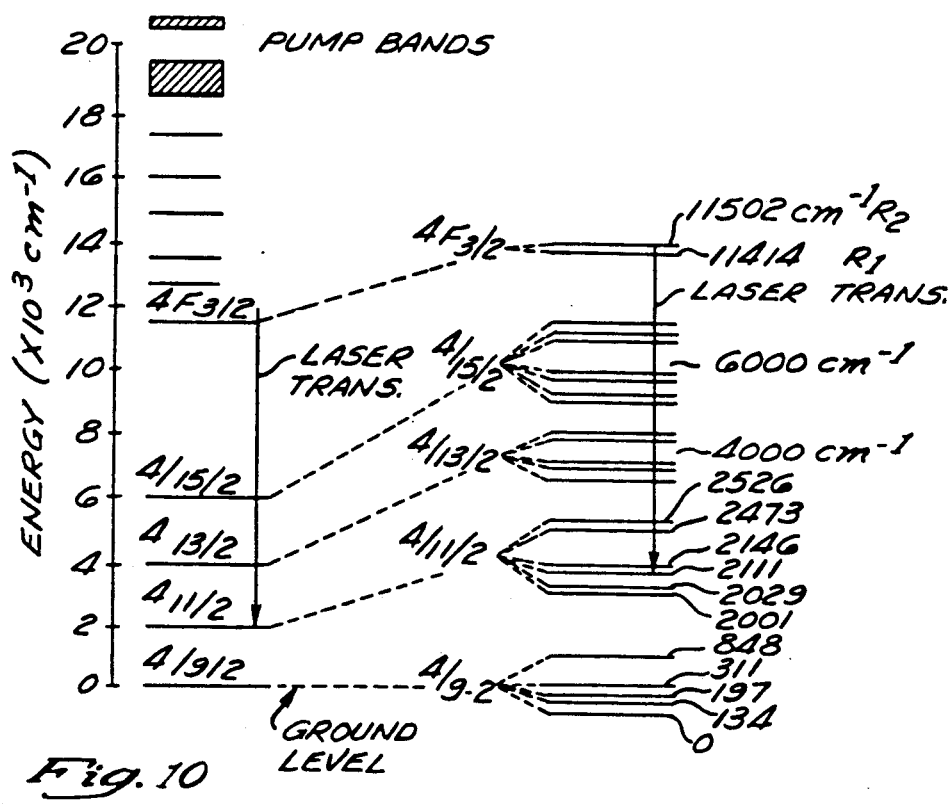
FIG. 10 is an energy level diagram of Nd:YAG.

FIG. 10 illustrates, in greater detail, the multiple energy states of Nd:YAG material, as well as the laser transition of this material, which is used as an example in the following discussion.

An input light signal at the laser transition wavelength (e.g. 1.064 microns), i.e., one of the wavelengths of light emitted by the Nd:YAG ions during relaxation between the upper and the lower laser levels, traveling through the excited laser fiber 12 (FIG. 1) will trigger the emission of stimulated photons at the same frequency, coherent with the signal, and the signal is thereby amplified. Thus the passage of light at this frequency will cause a photon emitting relaxation between the upper lasing level and lower energy level of FIG. 9A, in phase with the light signal to be amplified, yielding an effective gain for the input light signal.

The gain which can be achieved in the amplifier of this invention is dependent upon the density of the inverted neodymium ion population within the Nd:YAG crystal.

Theoretical calculations of the small signal gain per unit length $q_0$ of the amplifier of this invention can be made, using the relation $q_0 = \sigma \Delta N$, where $\sigma$ is the effective stimulated emission cross section, for Nd:YAG, about $3.0 \times 10^{-19}$ cm$^2$ for the 1.06 micrometer transition, and $\Delta N$ is the population inversion density given by:

$$\Delta N = \frac{P_p}{V} \frac{t_f}{h\nu_p} \tag{6}$$

where $P_p$ is the total absorbed pump power absorbed by the signal fiber 12, V is the crystal volume and thus, $P_p/V$ is the total absorbed pump power per unit of fiber volume, $t_f$ is the fluorescence lifetime of the upper laser level 2 of FIG. 5A, that is, the 230 microsecond fluorescence relaxation time of the neodymium ions, and $h\nu_p$ is equal to the pump photon energy.

The gain $\gamma_o$ of an amplifier fiber of length L may be expressed as:

$$\gamma_o = g_o L \tag{7}$$

Combining the above relationships, it may be seen that the gain $\gamma_o$ is:

$$\gamma_o = \sigma \frac{P_p}{A} \frac{t_f}{h\nu_p} \tag{8}$$

where A is the cross sectional area of the amplifier fiber.

It should be recognized that the value $P_p$ is the absorbed pump power and that an increase in the length of the fiber 12 does not necessarily increase the gain. Thus, if the length of the fiber 12 is sufficient so that the pumping radiation passing through the Nd:YAG fiber is essentially completely absorbed, then the value $P_p$ in this equation may be replaced by the input pump power. For a typical pump photon wavelength of 0.81 micrometers, the value of $\gamma_o$ is equal to 0.01 dB for $P_p$ equal to 1 milliwatt in a fiber having a 120 micron diameter. To obtain the net gain, however, one must subtract from $\gamma_o$ the fiber propagation losses at 1.06 micron experienced by the signal as it propagates through the fiber 12. A fiber loss of 100 dB per kilometer would reduce the gain by only 0.001 dB per centimeter. Thus, if the overall length of the amplifier can be maintained relatively short, as by arranging to have most of the pump power substantially absorbed over a short length of fiber, the propagation losses within the amplifier can be maintained at a low level.

It will be recognized that the pumping light from the sources 24 which enters the interaction region 28 will tend to be initially absorbed adjacent the end 18, and thus the length 27 of the interaction region of the fiber 12 may not be uniformly illuminated by the sources 24.

Thus, the inverted population of neodymium ions may not be symmetrically distributed along the length 27. To compensate for this non-symmetry, it may be advantageous to pump the quartz jacket 14 at both ends simultaneously to assure that the inverted neodymium ion population will be symmetrical along the length 27 of the fiber 12. Also, pumping from both ends will yield more pump power in the jacket 14, and thus, more gain.

Figure 11:
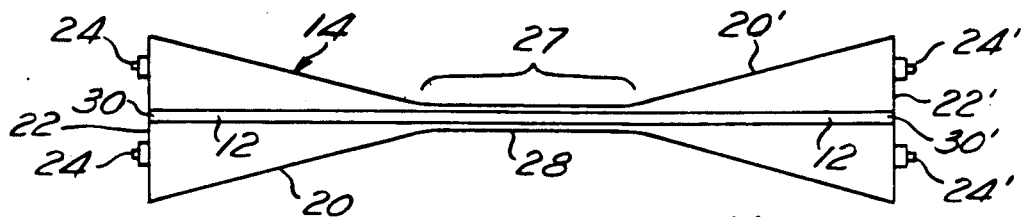
FIG. 11 is a diagram showing the physical arrangement of an alternative embodiment of the fiber amplifier of the present invention in which the amplifier fiber is pumped from opposite directions.

Accordingly, as shown in FIG. 11, the jacket 14 may include a second cone shaped transition portion 20' having a large end face 22' upon which plural light sources 24' are mounted. The cone shaped portion 20' may be identical to the cone shaped portion 20, and the sources 24' may be identical to the sources 24. Thus, with the arrangement of FIG. 11, pump light is input to both ends 22, 22' the jacket 14, and the cone shaped portions 20, 20' focuses this pump light for introduction into the interaction region 28 from opposite ends thereof.

It should also be recognized that the pumping illumination supplied from the pump sources 24 and 24' to the Nd:YAG fiber 12 should be sufficient, on a continuing basis, to replace the depleted population within the fiber 12 which occurs when the signals are amplified. Thus, for example, in a gyroscope where a pulse signal circulates through a kilometer of fiber, the counter-propagating signals will traverse the amplifier approximately once each five microseconds. If continuous pump sources are used, they should provide sufficient output so that, during each five-microsecond period, they are capable of reinverting the neodymium ion population which has relaxed during each successive traverse of the signals, to reinvert a population equal to that which has relaxed, such that the amplifier gain experienced by the signals will remain relatively constant.

It should also be recognized that the structures shown in FIGS. 1 or 11 will provide an oscillator or source for illumination at the laser frequency of the Nd:YAG fiber if the ends, (e.g. the ends 30 and 32 of FIG. 1 or the ends 30 and 30'0 of FIG. 11) are properly mirrored. Thus, by placing a mirror on the end 30 (FIGS. 1 and 11) of the fiber 12 which reflects nearly 100% of illumination at the laser frequency and by placing a second mirror on the other end (e.g. the end 32 of FIGS. 1 and 30' of FIG. 11) of the fiber 12 which reflects a lower percentage of illumination at the same frequency, the structures shown in FIGS. 1 and 11 may be used as a fiber laser source, with coherent light waves reflected back and forth through the fiber 12, and being emitted through the partially reflective mirror at the end 32, as coherent wave fronts of light at the laser frequency for the fiber.

When the structure, shown in FIGS. 1 and 11 are used as a laser source, the pumping sources 24 (FIGS. 1 and 11) and 24' (FIG. 11) may provide steady state light output at the pumping wavelength, in which case a steady state continuous light output will be provided by the fiber source. If, on the other hand, the pumping light from the light sources 24 and 24' is modulated, a modulated output may be produced within the structures of FIGS. 1 and 11.

The cone shaped jacket 24 may be manufactured using a hollow quartz rod having a diameter equal to the diameter of the large end portion 16. The rod is heated in a high temperature flame and quickly pulled apart, reducing the diameter of the rod such that the fiber 12 fits therein. The ends of the rod are then cleaved and the hollow spaces in the rod are then filled with an index matching material having a refractive index equal to that of the quartz rod. The end faces 22, 29 are formed utilizing e.g. miniature optical glass plates which are bonded or attached by other suitable means to the ends of the rod. Those skilled in the art will recognize that the foregoing process is a laboratory technique and that more sophisticated manufacturing techniques are also available.

What is claimed is:

1. A fiber optic device for producing coherent light, comprising:
    an optical fiber, for guiding an optical signal, said fiber comprising a laser material;
    a jacket, surrounding at least a portion of said optical fiber, to provide a cladding for said optical fiber which has a refractive index selected to cause said optical signal to be guided within said optical fiber, said jacket comprising:
        a first end having an end face for receiving pump light;
        a second fiber sized end, having a diameter which is small compared to said first end; and
        a transition portion, between said first and second ends; and means for preferentially introducing collimated pump light into said end face at a location which is offset from said optical fiber to nonuniformly illuminate said end face to preferentially excite high order modes in said jacket, said transition portion of said jacket configured to focus said pump light at said second end, said focused pump light refracting from said jacket into said fiber to cause inversion of the electronic population of said laser material to cause emission of photons from said laser material.

2. A fiber optic device for producing coherent light, as defined in claim 1, wherein said optical fiber has a radius, and wherein the thickness of said jacket at said second end is no more than one-half the radius of said optical fiber.

3. A fiber optic device for producing coherent light, as defined in claim 1, wherein said means for introducing comprises a light source for producing said collimated pump light.

4. A fiber optic device for producing coherent light, as defined in claim 3, wherein said pump light source comprises a high power laser diode, oriented such that the lengthwise direction of the emitting area is normal to a radial line passing through the central longitudinal axis of said jacket.

5. A fiber optic device for producing coherent light, as defined in claim 3, wherein said collimated pump light source comprises a high power laser diode and a collimating microlens.

6. A fiber optic device for producing coherent light, as defined in claim 1, wherein said jacket is symmetrical about its central longitudinal axis, and said optical fiber lies along the central longitudinal axis of said jacket.

7. A fiber optic device for producing coherent light, as defined in claim 1, wherein said jacket is surrounded by a material having a third refractive index, lower than said second refractive index, to cause total internal reflection of said pump light within said jacket to cause said pump light to be guided by said jacket.

8. A fiber optic device for producing coherent light, as defined in claim 7, wherein said material surrounding said jacket is air.

9. A fiber optic device for producing coherent light, comprising:
    an optical fiber, comprising a laser material;
    a light source, spaced radially from said optical fiber for producing collimated pump light to pump said optical fiber; and
    means for cladding said optical fiber to guide an optical signal within said optical fiber, said cladding means additionally guiding said pump light within said cladding means for propagation in a direction along the length of said optical fiber, said cladding means configured to tightly focus said pump light to a fiber sized cross section to significantly increase the optical density of said pump light in said optical fiber, said focused pump light refracting into said optical fiber to cause an electronic population inversion in said laser material.

10. A fiber optic device, as defined in claim 9, wherein said cladding means focuses said pump light to a dimension less than one and one-half times the diameter of said optical fiber.

11. A method of making a device for producing coherent light, said method comprising:
    cladding an optical fiber comprising a laser material with a jacket having an index of refraction lower than said optical fiber to cause an optical signal propagating in said fiber to be guided by said fiber;
    forming said jacket to provide a fiber sized cross section at one end which is small compared to the cross section at the other end;
    mounting a pump light source for preferentially introducing collimated pump light into said other end of said jacket at a location which is radially offset from said optical fiber to preferentially excite high order modes in said jacket; and
    configuring said jacket to focus said pump light to said fiber sized cross section at said one end of said jacket.

12. A method of making a device for producing coherent light as defined by claim 11, wherein the step of forming said jacket includes providing a thickness for said jacket at said one end which is less than one-half of the radius of said optical fiber.

13. A fiber optic device for producing coherent light, comprising:
    an optical fiber, for guiding an optical signal, said fiber comprising a laser material;
    a jacket, surrounding at least a portion of said optical fiber, to provide a cladding for said optical fiber which has a refractive index selected to cause said optical signal to be guided within said optical fiber, said jacket comprising:
        a first end having an end face for receiving pump light;
        a second fiber sized end, having a diameter which is small compared to said first end;
        a transition portion, between said first and second ends;
        a source of collimated pump light for introducing pump light into said end face, said transition portion of said jacket configured to focus said pump light at said second end, said focused pump light refracting from said jacket into said fiber to cause inversion of the electronic population of said laser material to cause emission of photons from said laser material.

14. A fiber optic device for producing coherent light, as defined in claim 13, wherein said optical fiber has a radius, and wherein the thickness of said jacket at said second end is no more than one-half the radius of said optical fiber.

15. A fiber optic device for producing coherent light, as defined in claim 13, wherein source of pump light is disposed at a location which is radially offset from said optical fiber to nonuniformly illuminate said end face.

16. A fiber optic device for producing coherent light, as defined in claim 15, wherein said pump light source includes a collimating microlens.

17. A fiber optic device for producing coherent light, as defined in claim 16, wherein said collimated pump light source comprises a high power laser diode.

18. A fiber optic device for producing coherent light, as defined in claim 13, wherein said pump light source comprises a high power laser diode, which is radially offset from said optical fiber and oriented such that the lengthwise direction of the emitting area is normal to a radial line passing through the central longitudinal axis of said jacket.

19. A fiber optic device for producing coherent light, as defined in claim 13, wherein said jacket is symmetrical about its central longitudinal axis, and said optical fiber lies along the central longitudinal axis of said jacket.

20. A fiber optic device for producing coherent light, as defined in claim 13, wherein said jacket is surrounded by a material having a third refractive index lower than said second refractive index, to cause total internal reflection of said pump light within said jacket to cause said pump light to be guided by said jacket.

21. A fiber optic device for producing coherent light, as defined in claim 20, wherein said material surrounding said jacket is air.

22. A fiber optic device for producing coherent light, comprising:
an optical fiber, comprising a laser material; and
a source of collimated pump light for pumping said optical fiber;
means for cladding said optical fiber to guide an optical signal within said optical fiber, said cladding means additionally guiding said pump light within said cladding means for propagation in a direction along the length of said optical fiber, said cladding means tightly focusing said pump light to a fiber size cross section to significantly increase the optical density of said pump light in said optical fiber, said focused pump light refracting into said optical fiber to cause an electronic population inversion in said laser material.

23. A fiber optic device, as defined in claim 22, wherein said cladding means focuses said pump light to a dimension less than one and one-half times the diameter of said optical fiber.

24. A method of making a device for producing coherent light, said method comprising:
cladding an optical fiber formed of layer material with a jacket having an index of refraction lower than said optical fiber to cause an optical signal propagating in said fiber to be guided by said fiber;
forming said jacket to provide a fiber sized cross section at one end which is small compared to the cross section at the other end;
mounting a source of collimated pump light at said other end of said jacket;
configuring said jacket to focus said pump light to said fiber sized cross section at said one end of said jacket.

25. A method of making a device for producing coherent light as defined by claim 24, wherein the step of forming said jacket includes providing a thickness for said jacket at said one end which is less than one-half of the radius of said optical fiber.

26. A method of side pumping an optical fiber formed of a laser material to cause inversion of the electronic population of said material, said method comprising:
producing collimated pump light rays in a jacket;
using said jacket to guide said pump light rays for propagation in a direction along the length of said fiber;
using said jacket as a cladding for said fiber for guiding an optical signal in said optical fiber; and
tightly focusing said pump light rays to a dimension less than one and one-half times the diameter of said optical fiber to cause said population inversion.

* * * * *